Patented Mar. 13, 1923.

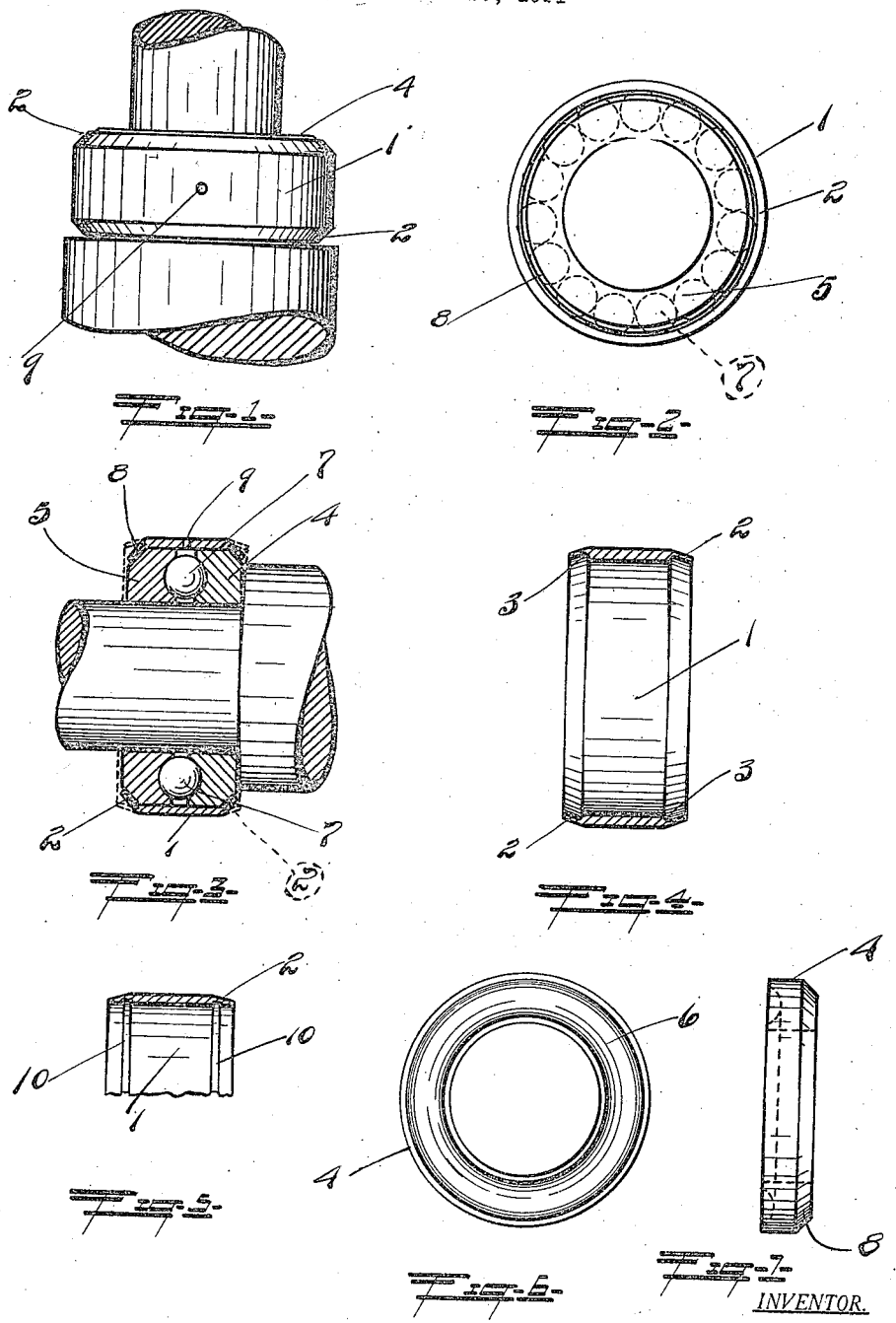

1,448,122

UNITED STATES PATENT OFFICE.

FRANK E. KENT, OF BAY CITY, MICHIGAN.

BEARING.

Application filed January 20, 1921. Serial No. 438,605.

*To all whom it may concern:*

Be it known that I, FRANK E. KENT, a citizen of the United States of America, residing at Bay City, in the county of Bay and State of Michigan, have invented certain new and useful Improvements in Bearings, of which the following is a specification.

This invention relates to bearings and the like, and especially to end thrust bearings.

One object of the invention is to provide a bearing which is very economical to manufacture and in which the assembly of the parts may be effected in a simple and convenient manner.

A further object of the invention is to provide a so-called end thrust bearing which is capable of withstanding the constant chucking and pounding to which it is subjected by high speed machinery, such as drill presses and the like.

A still further object is to provide a bearing so constructed that it is impossible for the balls to become misplaced excepting by the complete breakage of the casing and raceway.

With the above and other objects in view, the present invention consists in the combination and arrangement of parts, hereinafter more fully described, illustrated in the accompanying drawing, and particularly pointed out in the appended claims, it being understood that changes may be made in the form, size, proportion and minor details without departing from the spirit, or sacrificing any of the advantages of the invention.

In the drawing:—

Fig. 1 is a side view showing my improved bearing in working position.

Fig. 2 is a top plan view, and

Fig. 3 is a sectional view.

Fig. 4 is a sectional view of the outer shell or casing.

Fig. 5 illustrates a fragmentary sectional view of the outer shell constructed slightly different than that shown in Fig. 4.

Fig. 6 is an inner side view of one of the halves of the raceway.

Fig. 7 is an edge view thereof.

Referring now more particularly to the drawing in which I have shown the preferred embodiment of my invention, and in which the outer annular shell or casing is indicated by the numeral 1, this casing is formed of relatively thin material, and is formed with the tapered edges 2, and in my preferred form I have made these tapered edges of uniform thickness by first cutting the exterior edges of the shell to the proper angle and then inserting the tool inside the shell and cutting the inner surface to the same angle and forming a circumferential groove 3 on the inner surface of the shell, making these edges of a uniform thickness and approximately one half the thickness of the shell proper for a purpose to be presently described. This structure provides inclined annular flanges at the ends of the outer cylindrical casing.

Suitable ball races 4 and 5 of the same configuration are positioned as clearly shown in Fig. 3 of the drawing, the inner surfaces being grooved as shown at 6, and adapted to receive an annular series of anti-friction bearing balls 7 between them, the outer circumferential edges of these raceways being cut to an approximate angle of forty-five degrees as shown at 8. These balls and raceways are preferably formed of polished extremely hard steel, and when in use on high speed machinery are lubricated with a light oil through the oil hole 9, it is not necessary that this outer shell or casing 1 be of hard steel as this merely holds the balls and raceways in proper position and relation to each other.

In assembling the bearing, the series of balls are first located in the raceway and the shell or casing 1 placed over same, the edges 2 projecting slightly beyond the raceway as clearly shown by dotted lines in Fig. 3. These edges are then bent inwardly to position as shown in full lines, the bending point being approximately in line with the upper edge of the raceway, thereby securing the balls and raceway in the shell, the edges of the raceways projecting beyond the edges of the casing as shown, the circumferential groove 3 which is located where the taper on the outer surface begins forming the bending point, this will eliminate puckering, splitting or cracking of the material at this bending point.

An alternate method of forming this shell is shown in Fig. 5 of the drawing in which the outer edges of the material is first tapered in the same manner as shown in Fig. 4 and a circumferential groove 10 is then cut in the interior of the shell directly beneath the starting point of the taper, and which I term the bending point. This is also a very satisfactory method, the principle involved being substantially the same and I do not wish to be limited to my preferred method.

In practise the bearing is placed in position on a shaft, the outer edge of one half of the raceway resting on the shoulder of the shaft and either a non-rotating or a rotating member can be placed on top and contact with the outer edge of the opposite half of the raceway, or the bearing can be used in position as shown in Fig. 3 or in any supporting structure where it is desired to take up end thrust.

From the foregoing description it will be obvious that I have perfected a very simple and efficient end thrust bearing, economical to manufacture and very easy to assemble.

What I claim is:—

A thrust bearing comprising annular raceway members, antifriction balls carried by the same, and an outer cylindrical shell or casing surrounding the race-way and having its end portions beveled, said beveled end portions being reduced at their inner faces to form end flanges and the said shell or casing being provided at the juncture of the reduced portions with interior circumferential grooves adapted to permit the reduced end portions of the shell or casing to be bent inwardly to confine the race-way members within the shell or casing without cracking the said flanges.

In testimony whereof, I affix my signature.

FRANK E. KENT.